United States Patent [19]

Link et al.

[11] 4,316,398
[45] Feb. 23, 1982

[54] LOADING AND/OR UNLOADING DEVICE FOR MACHINE TOOLS, PARTICULARLY AUTOMATIC LATHES

[75] Inventors: Helmut F. Link, Aichwald; Paul Waiblinger, Esslingen, both of Fed. Rep. of Germany

[73] Assignee: Index-Werke KG Hahn & Tessky, Esslingen, Fed. Rep. of Germany

[21] Appl. No.: 115,806

[22] Filed: Jan. 28, 1980

[30] Foreign Application Priority Data

Feb. 3, 1979 [DE] Fed. Rep. of Germany ....... 2904088

[51] Int. Cl.³ .............................................. B23B 13/02
[52] U.S. Cl. ............................................................ 82/2.7
[58] Field of Search ................................... 82/2.5, 2.7

[56] References Cited

U.S. PATENT DOCUMENTS

| | | | |
|---|---|---|---|
| 3,455,190 | 7/1969 | Dalik | 82/2.7 |
| 4,061,062 | 12/1977 | Peltier | 82/2.7 |
| 4,065,988 | 1/1978 | Lohneis et al. | 82/2.5 |

FOREIGN PATENT DOCUMENTS

| | | |
|---|---|---|
| 2159552 | 6/1973 | Fed. Rep. of Germany . |
| 2444124 | 4/1976 | Fed. Rep. of Germany . |
| 867108 | 5/1961 | United Kingdom . |

*Primary Examiner*—Leonidas Vlachos
*Attorney, Agent, or Firm*—Shenier & O'Connor

[57] ABSTRACT

A mechanism for loading and/or unloading automatic lathes. A feed device having a transport means is provided for feeding a workpiece to a transfer station. The feed device is associated with a pivotable carrier member and includes means for gripping the workpiece.

13 Claims, 9 Drawing Figures

LOADING AND/OR UNLOADING DEVICE FOR MACHINE TOOLS, PARTICULARLY AUTOMATIC LATHES

DESCRIPTION

The invention relates to a loading and/or unloading device for machine tools, in particular automatic lathes.

The state of the art already embraces many loading and unloading devices by means of which workpieces can be fed to the work spindle present in the working space of the machine and/or transported away from the said working space.

However, these known constructions cannot cope with all the demands made of them. For instance, these constructions which are adapted to be associated with lathes both externally as well as internally, i.e. to be disposed inside the working space, and documented for example by specialist literature, for instance ZwF 69 (1974) No. 1; Fertigungstechnik und Betrieb 1964, No. 8 and DAS No. 21 59 552, have in common the essential disadvantage that they hamper access to the working space of the machine, so that any exchange of tools which may become necessary in the machine is made difficult and that conversion to manual charging means that the device or parts thereof have to be dismantled. Furthermore, association of these devices with lathes is very unfavourable so that masking of the machine against chips and coolants is only incomplete, or alternatively has to be opened and closed automatically when the machine is charged. It is evident that in this respect particularly devices which have to be provided at least partially on the outside of machine tools necessitate considerable expenditure in connection with the provision of safety measures.

Therefore, the invention is based on the problem of providing a loading and/or unloading device which can be so integrated into machine tools, particularly NC controlled lathes that it is possible to accommodate in the region of the working space of the machine the parts which are essential to their functioning without occupying space by which for example manual jobs in the working space of the machine, tool changing or the like, or access to this area might be hampered. Furthermore, when the cladding around the machine is closed, the device should be capable of effecting workpiece transport to or away from the work spindle without components thereof emerging from the working space of the machine, on the operating side. Furthermore, it is intended that workpiece transport be accelerated over relatively short distances and finally that the device should operate in an optimum and accident-proof manner.

In order to resolve this problem, the invention is based on the concept of a known loading and/or unloading device according to DAS No. 21 59 552.

The construction and disposition of feeding device and transport device in accordance with the invention as well as their relationship with the work spindle permit of workpiece transport along partial distances which extend in planes which are at right-angles to one another. In consequence, it is possible so to feed workpieces to the working space of the machine, for example from one of its end walls, that the area in front of the working space of the machine can remain completely free from components of the loading and unloading device. The rotatable disposition of the workpiece gripper of the feeding device on the pivotable carrier thereof makes it possible for workpieces at the transfer station of the device to be offered to the workpiece clamping device of the transport device always in such a position that as desired, machining of the workpiece can take place from a predetermined end of the workpiece. The rotatable disposition of the workpiece gripper of the feeding device thus permits workpieces to be delivered to the transport device in the correct manner to be clamped, whereby the workpieces can be fed to the feeding device in any location or position which is suitable according to the conveying direction and the space available. It is merely expedient to feed workpieces to the workpiece gripper of the feeding device in a uniform position. If the device according to the invention is used only for carrying machined workpieces away from the work spindle, then by reason of the rotatable location of the workpiece gripper of the feeding device, it is possible to feed machined workpieces in any desired position to a delivery station, whereby it is readily possible to deposit workpieces for example on the end face at which they had been clamped by the workpiece clamping device of the transport device for removal from the work spindle. The embodiment according to the invention therefore makes it possible to clamp or deposit workpieces on one or on any desired end face or on a part of its periphery.

The drive for rotating the workpiece gripper can be invariably adapted to a workpiece which has to be transported so that workpieces can be made ready in front of the workpiece clamping device of the feeding device in a quite specific position. It is however substantially more favourable that the device is universal in use or so that workpieces can be offered to the workpiece clamping device by the feeding device in any desired clamping position.

In a further advantageous development of the invention a construction makes it possible in a particularly simple manner to convert the feeding device to workpieces of different dimensions in that for this purpose it is necessary only to alter the gap between the pivoting arms accordingly.

It is evident that the device as so far explained, for loading or unloading can be disposed at will in the space and can accordingly also be used advantageously for machine tools in which the work spindle is vertically mounted.

In the case of such a concept, a part of the device, namely the feeding device, is disposed outside of the machine work space and the transport device, by virtue of its displaceability, can both during workpiece machining and also when not required, be controlled to move into a position in which the least possible space is required to accommodate it in the work space of the machine. This is the case for example if the transport device is controlled to move into a position in front of the transfer station of the feeding device. In this case, the operator can carry out any work necessary in the working space of the machine substantially without hindrance.

What is essential thereby is that this disposition of the device according to the invention permits of workpiece feeding or workpiece removal according to the problems on which the invention is based, which inter alia means that workpiece handling can take place while the cladding around the machine is completely closed so that the existing safety regulations are substantially satisfied.

A development of the device permits of both feeding workpieces, for example blanks, to the horizontally mounted work spindle of a lathe as well as the removal of machined workpieces from the work spindle and out of the closed machine working space. With it, these operations can easily be carried out by duplication of the feeding device and provision of the carrier of the transport device with two pivoting arms or workpiece clamping devices. It is possible to associate with the additional feeding device a horizontal conveyor forming in particular an endless conveyor for carrying away the workpieces fed to the transfer station. It is possible for the two functional units of the loading and unloading device which are formed in each case by a feeding device and a horizontal conveyor, to be of the same construction. In this case, the pivoting arms of the carrier of the transport device which carry the workpiece clamping devices are so located in a common plane that they are individually controllable to move in front of the work spindle and jointly to the transfer station of the feeding devices associated with them.

Where it is a machine tool, particularly a lathe, which is involved, the machine working space of which is bounded at the head stock end by a flush wall of a housing like machine cladding arrangement engaging around the machine working space and possibly the head stock, then an advantageous embodiment emerges in that the transfer stations of the feeding devices are located immediately behind the splash wall in which, for each transfer station, an aperture must be provided which traverses the splash wall and through which the workpiece clamping devices of the feeding device have access to the transfer station associated with them. It is then advantageous if each of the two workpiece clamping devices has a closure member which in the transfer position of the workpiece clamping devices in front of the feeding devices and during workpiece machining maintain the apertures in the splash wall closed.

Further features and details of the invention are explained in the ensuing description of an example of embodiment of a loading and unloading device combined with an NC controlled lathe which is shown in the accompanying drawings, in which.

Figure 7A:
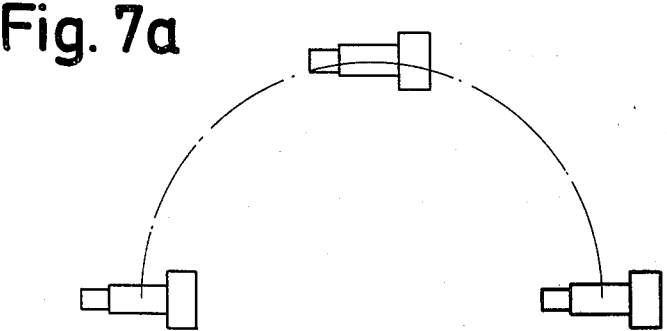
Figure 7B:
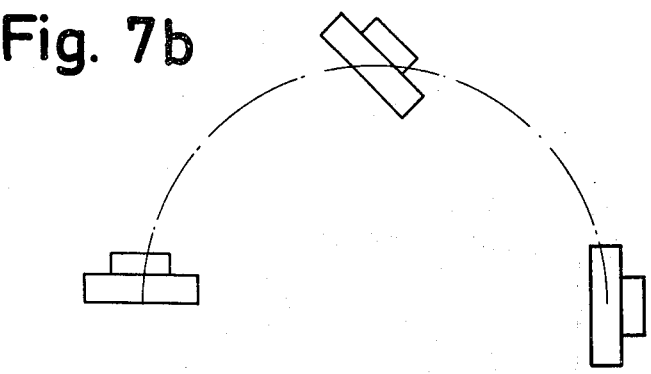
Figure 7C:
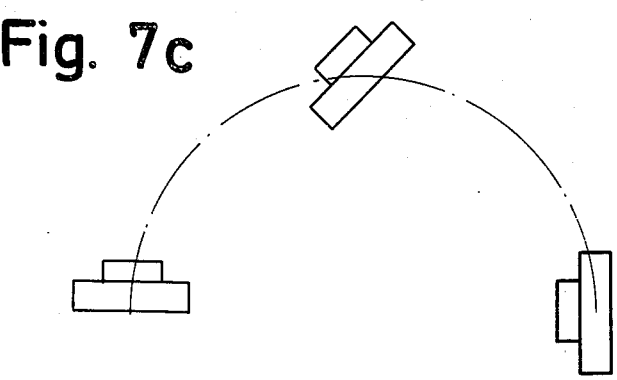

FIGS. 7a–c show diagrams to illustrate possibilities of workpiece handling by the feeding devices.

The NC controlled lathe, part of which is shown in the drawings, has a machine frame 10 with a head stock 12. Horizontally mounted in the head stock 12 is a work spindle 16 carrying for example a chuck 14.

Associated with the work spindle and generally designated 20 is a turret slide which is displaceably located on an inclined bed guide 22. 24 designates its turret head. Instead of the chuck, the work spindle may also be equipped with some other clamping mechanism, for example a collet chuck. The machine working space is designated 26 and at the head stock end it is bounded by a splash wall 28 of machine cladding which is generally designated 30 and which has at the operating end and in per se known manner a sliding door 32 by which the machine working space can be opened and closed.

The lathe is equipped with, according to the invention, a loading and unloading device by means of which prepared workpiece blanks 34 can be transported into the closed machine working space 26 and fed to the chuck 14 of the work spindle 16 or alternatively machined workpieces can be removed from the chuck and transported away out of the closed machine working space 26. For this purpose, the device has altogether three functional units of which two are provided laterally of the head stock 12 while the other is disposed within the working space 26 of the machine. Two functional units are thereby identical in their construction and are located for example at the front of the lathe in front of the head stock and are at a distance one above the other. They form two feeding devices 36, 38 by which the workpiece blanks 34 which are disposed at the top are made ready individually at a transfer station immediately behind the splash wall 28 and which are collected from there by the third functioning unit which constitutes a transport device generally designated 40 for loading and unloading the chuck 14, and which is provided in the working space of the machine, and after machining are transferred to the lower feeding device 38 by which they are fed to a further transfer station which will be dealt with in greater detail hereinafter.

By means of these feeding devices and the transport device, workpieces can be transported along partial distances which extend in planes a-a; b-b which extend perpendicularly to one another. Accordingly, it is possible, by providing corresponding apertures 42, 44 in front of the feeding devices 36, 38 in the splash wall 28 automatically to feed into the machine working space 26 when the sliding door 32 in the machine cladding 30 is closed workpiece blanks which are to be machined and/or to carry away from the working space of the machine the workpieces which have been machined.

The two feeding devices 36, 38 have in each case, generally designated 46, a workpiece gripper which is pivotable about a pivoting axis which is disposed at a right-angle to the axis of the work spindle 16 and parallel with the conveying plane of a horizontal conveyor generally designated 48, by means of which workpiece blanks 34 or finished workpieces 34' can be moved parallel with the work spindle axis either towards or away from the feeding device. The pivoting axis of the workpiece gripper 46 is defined by a pivoting shaft 50 which can be rotated by means of a rotary drive 52 for instance through 180°. The rotary drive is constituted for instance by a double-acting cylinder-piston set through which a rack is axially displaceable in both directions and meshes in turn with a pinion on the pivoting shaft 50. The pivoting shaft is mounted on a console 54 which can be mounted laterally on the head stock to be displaceable and lockable in the conveying direction of the conveyor 48.

The workpiece gripper 46 is constituted by two pivoting arms 56, 58 which are rotationally rigidly disposed on the pivoting shaft at a distance one from the other and which carry at their free end, on the sides which face each other, a workpice gripper member 60, 62. These workpiece gripper members are rotatable by means of a drive about an axis parallel with the axis of the pivoting shaft 50, so that during pivoting of the workpiece gripper 46 about the axis of the pivoting shaft 50 workpiece blanks 34 clamped firmly between the workpiece gripper members can be rotated about an axis extending along its diameter. The purpose of this rotary movement will be explained in greater detail hereinafter.

Whereas thereby the workpiece member 60 of the pivoting arm 56 is constituted for example by a clamping plate rotatably disposed in the pivoting arm 56, in the case of the present example of embodiment, the gripper member 62 forms a for instance cross-sectionally V-shaped prism, of which the edges 64 which are at a distance from one another, form supporting members which can be pressed against the periphery of the workpiece blanks 34. The prism-shaped workpiece gripper member 62 is seated on a longitudinally toothed piston rod 66 of a cylinder-piston assembly 68 provided at the free end of the pivoting arm 58 and controllable by a pressurised medium, particularly oil under pressure, and which can be rotated through a predetermined angle of rotation by means of a gearing.

This gearing is constructed as a spur gear transmission and has two groups of intermeshing spur gearwheels which are disposed in a common plane. The first group of spur gears is formed by a driving pinion 70 and an intermediate gearhweel 72 while the second group is formed by two intermediate gearwheels 74, 76 and the driving pinion 78 which in turn meshes with the longitudinally toothed piston rod 66 of the piston-cyclinder assembly 68. The drive of the two separately running groups of gearwheels is effected via a pair of change wheels 80, 82 which can be rotationally rigidly fitted onto the gear shafts 84, 86 of the gearwheels 72, 74. The angle of rotation of the workpiece gripper members which have to be traversed about the axis c-c can thus be determined by a corresponding choice of change wheels 80, 82.

The driving pinion 70 of the spur gear transmission meshes with a longitudinally serrated stationary spindle 88, one end of which is mounted in the console 54 while its other end is mounted within the pivoting shaft 50. For this purpose, the rim of the driving pinion engages a corresponding longitudinal recess in the pivoting shaft. This is provided so that the gripper arm 58 together with the gripper arm 56 of the workpiece gripper 46 can be infinitely variably adjusted in an axial direction on the pivoting shaft 50 and locked so that the spacing-apart can be adapted to the diameter of workpieces which have to be transported.

In the case of the present example of embodiment, the pivoting arm 58 constitutes at the same time the transmission housing for the spur gear transmission described. As horizontal conveyors 48 for the feeding devices 36, 38 which are provided at a distance one above the other preferably endless conveyors are used which have for example a conveyor belt 90. Also any other construction of conveyor is conceivable so long as this guarantees that workpieces which have to be machined can be held ready at a predetermined location and at a predetermined plane in the upper feeding device 36. This predetermined take-up position is established by, co-operating with an electric switch 92, an abutment 94 on the upper feeding device 36, up to which moves the workpiece which is the next one which is to be fed to the chuck 14 of the work spindle and by which the conveyor is stopped.

As has already been explained hereinabove, the transport device 40 which serves as a loading and unloading device is located within the working space 26 of the machine. This can be moved in both directions parallel with the work spindle axis or in the conveying direction of the horizontal conveyor and can furthermore be pivoted transversely in relation to these directions. In the case of the present example of embodiment, it is so designed that it is capable simultaneously of taking over an unmachined workpiece which is held ready at a transfer station by the upper feeding device 36 while at the same time transferring a machined workpiece to the lower feeding device 38.

For this purpose, the transport device has a carrier formed by two mutually rigidly associated pivoting arms 96, 98, the pivoting arms carrying in the region of the free ends in each case and facing the splash wall 28 a workpiece clamping device 100, 102 and having radially movable clamping elements for holding workpieces. These clamping elements may be actuated for example hydraulically or pneumatically.

The two workpiece clamping devices 100, 102 are so associated with each other that they are adjustable by pivoting of the carrier formed by the pivoting arms about the axis of a pivoting tube 104 axially parallel with the work spindle 16 and carrying the pivoting arms 96, 98, in fact individually coaxially of the clamping chuck 14 but jointly in front of the feed devices 36, 38 or in front of the apertures 42, 44 in the splash wall 28 and associated with the feed devices. This facility for adjustment gives rise to the obtusely-angled reciprocal relationship of the pivoting arms. The pivoting tube 104 carrying them is correspondingly pivotable by means of a rotary drive 106.

Each of the two workpiece clamping devices is disposed in front of a disc-shaped closure member 108, 110 by which the apertures 42, 44 in the splash wall 28 can be simultaneously occluded when the transport device 40 assumes its position in front of the feeding devices 36, 38. The transport device stops in this position even during machining of a workpiece so that chips and splash water cannot emerge through the apertures 42, 44 from the working space 26 of the machine. The loading and unloading device described operates in the following way:

By means of the upper horizontal conveyor 48, serially presented workpiece blanks 34 are fed individually to the upper feeding device 36, the conveyor being in each case stopped when the blank which it is envisaged shall be the next one to be machined is transported between the workpiece gripper members 60, 62 of this feeding device and has met the abutment 94.

After clamping of the blank, the pivoting shaft 50 of the upper feeding device is pivoted by the rotary drive 52, in the present case through 180° in a clockwise direction, and as a result the blank is held ready immediately behind the slash wall 28 of the machine working space 26 in a transfer position for onwards transport. During the pivoting movement of the pivoting arms 56, 58 of the workpiece gripper 46 the blank is so rotated via the spur gear transmission of the pivoting arm 58 that, as FIG. 7b shows, its axis of rotation is orientated substantially parallel with the work spindle. The angle of rotation to be traversed can be established by the change wheels 80, 82.

Figure 4:
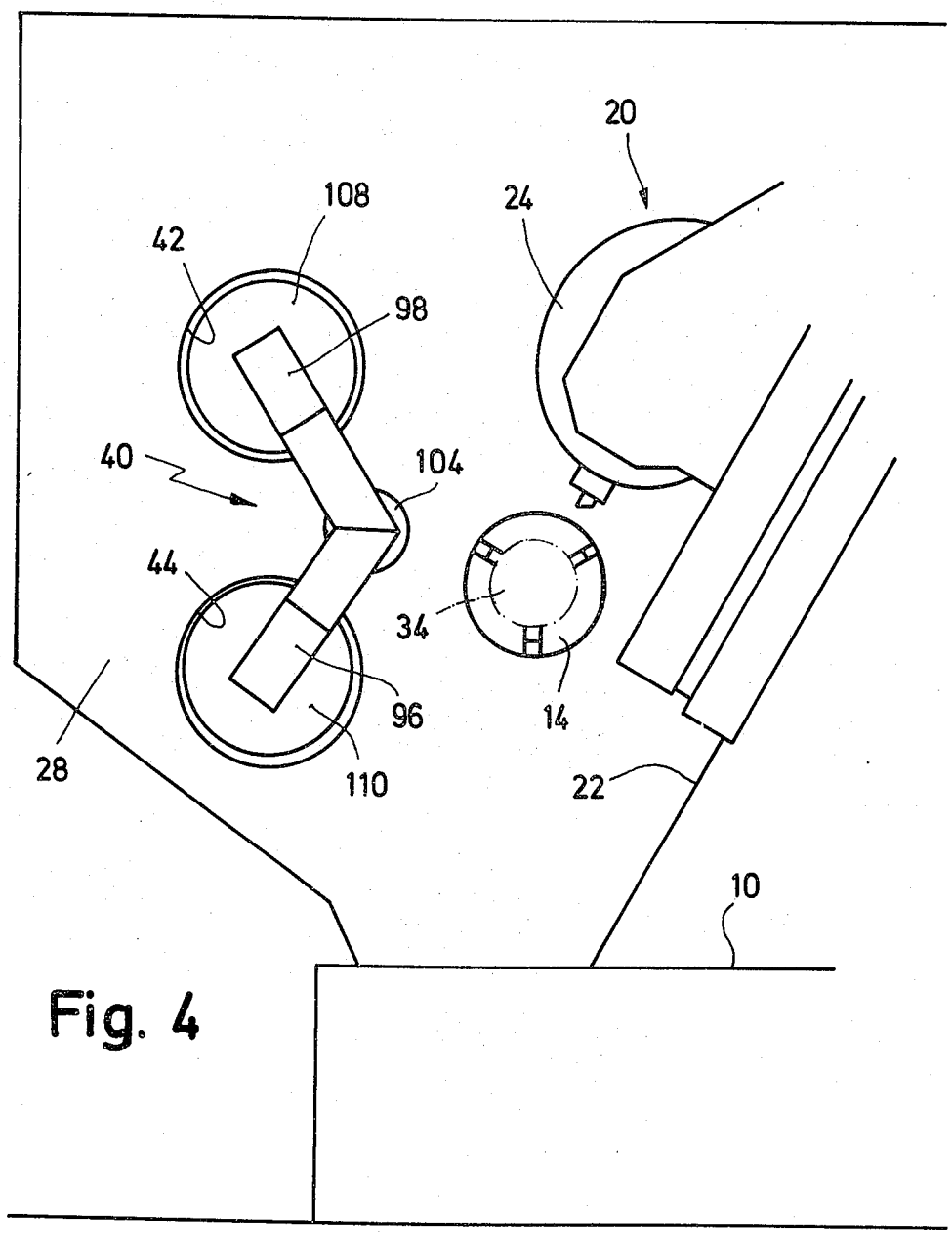
FIG. 4 is a partial side view of the lathe viewed in the direction of the arrow B in FIG. 2.
Figure 5:
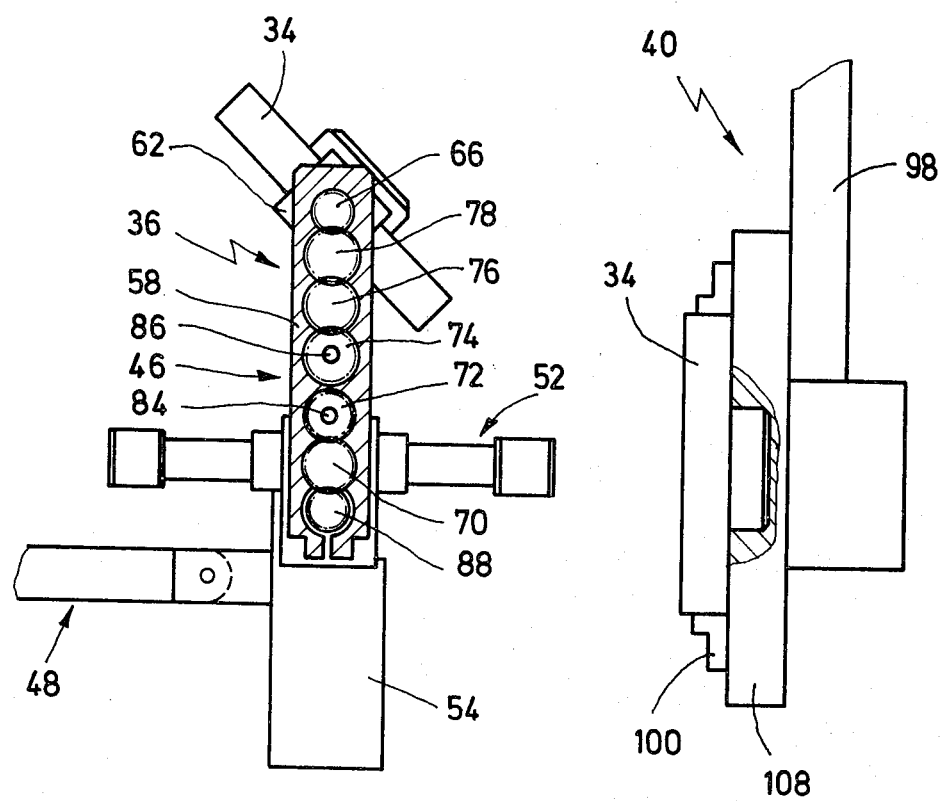
FIG. 5 is a partially broken away front view of the feeding device and of the workpiece clamping device of the tranport device.
Figure 6:
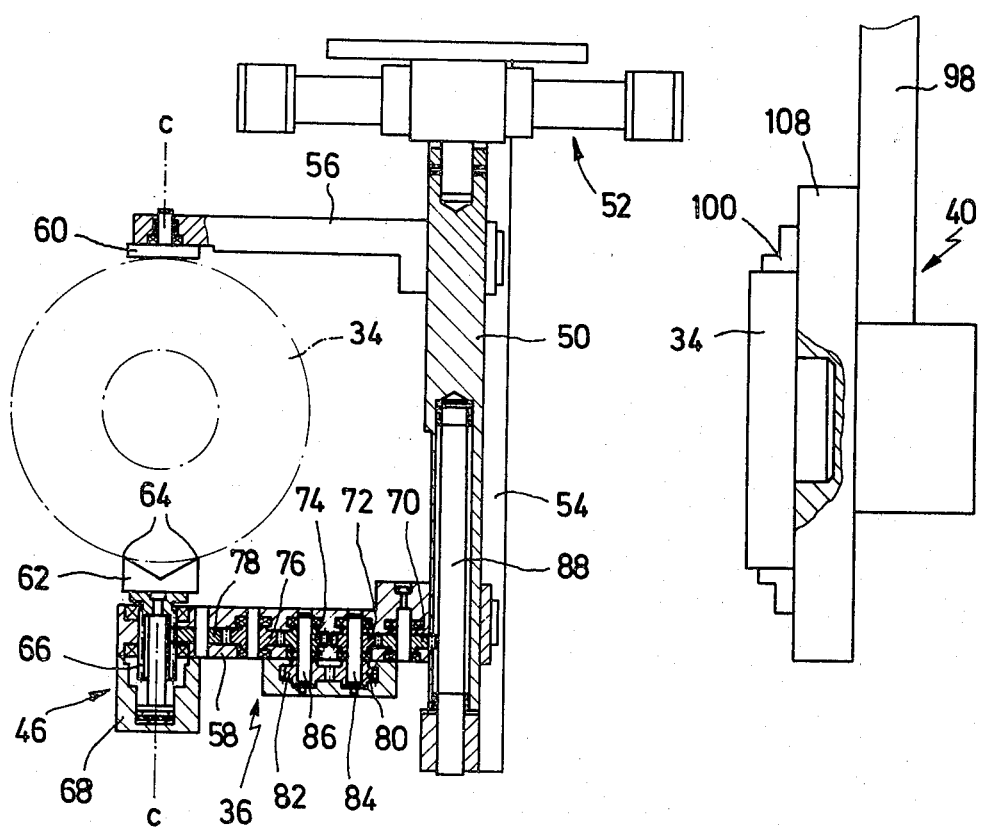
FIG. 6 is a partially broken away plan view of one of the feeding devices.

The blank which is held ready at the transfer station is then taken over by the—upper in FIG. 4—workpiece clamping device 110 of the transport device 40 which for this purpose traverses the aperture 42 in the splash wall 28. The transport device 40 is accordingly disposed in the position shown in FIG. 2.

Figure 1:
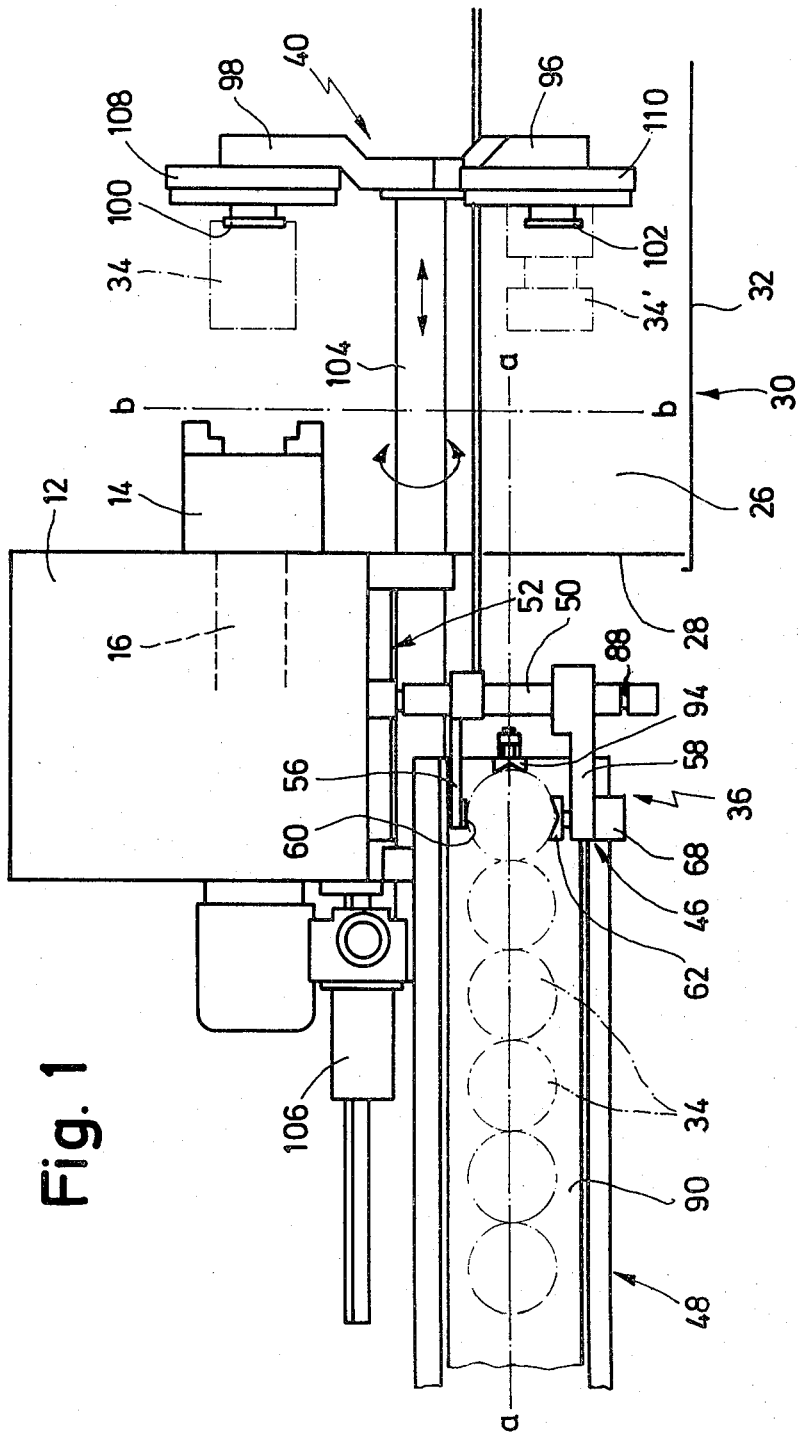
FIG. 1 is a partial plan view of the lathe equipped with the device.

Once the workpiece blank has been taken over, then first the pivoting tube 104 according to FIG. 1 is displaced in an axial direction rightwardly until the free end of the taken-over workpiece blank is in a plane which is perpendicular to the work spindle 16 which in turn is disposed at a distance in front of the chuck. When this happens, the workpiece clamping device 102 is still unoccupied. The pivoting tube 104 is now, according to FIG. 4, pivoted in a clockwise direction sufficiently that the workpiece blank accommodated by the workpiece clamping device 100 is disposed substantially coaxially of the chuck 14. When this extreme position is reached, the pivoting tube 104 is displaced axially again in the opposite direction, the workpiece blank being moved between the jaws of the chuck 14 to be clamped. After rigid clamping in the chuck, the workpiece clamping device 100 releases the blank, the transport device 40 is in turn controlled to move rightwardly by a small amount according to FIG. 1 in order that the workpiece clamping device may move away from the blank and afterwards there is a rotation of the pivoting tube 104 in an anti-clockwise direction so that both workpiece clamping devices 100, 102 can again be brought into an aligned position in relation to the apertures 42, 44 after which the transport device 40 is controlled so that it moves back into the waiting position shown in FIG. 2.

Figure 2:
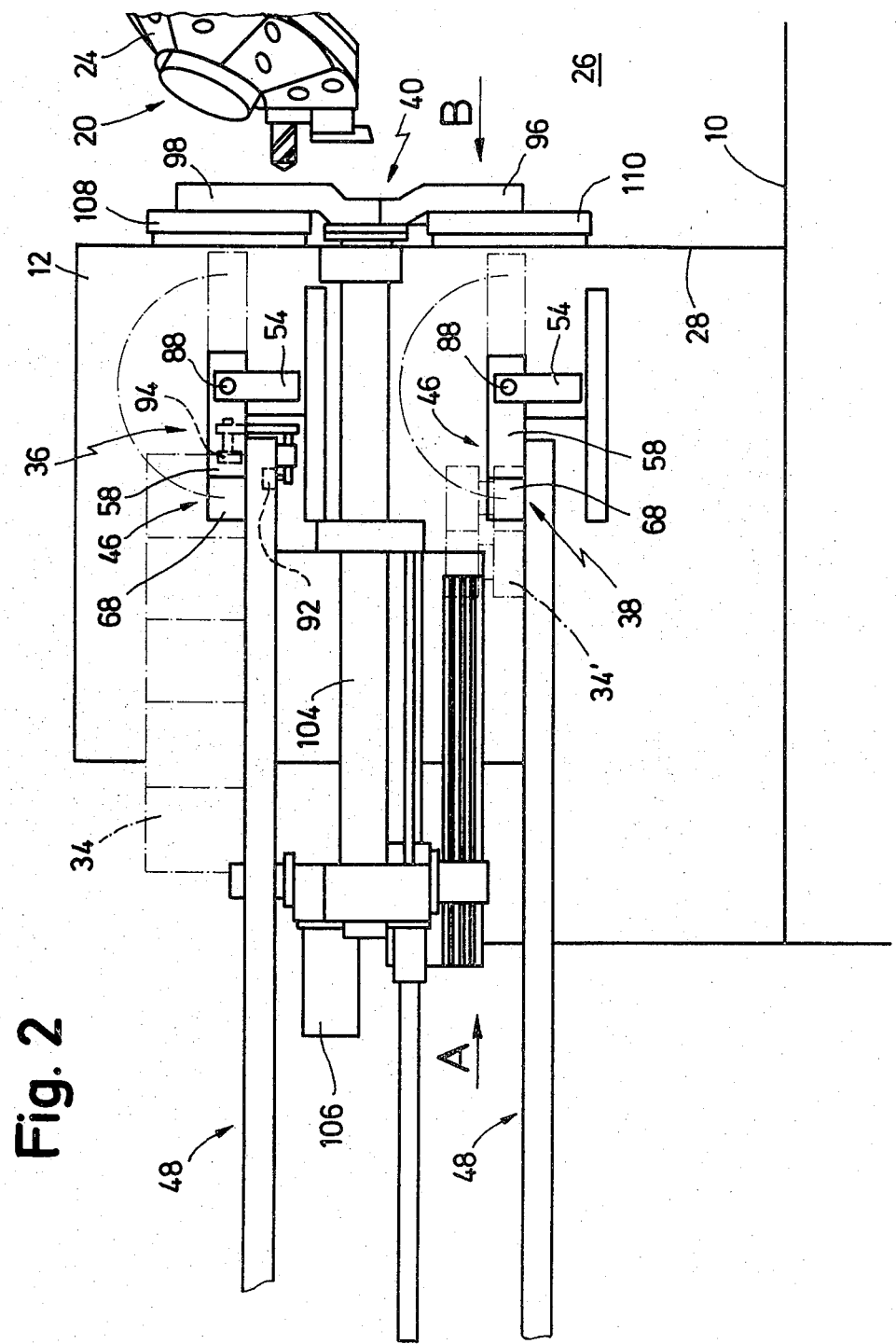
FIG. 2 is a front view of the lathe.
Figure 3:
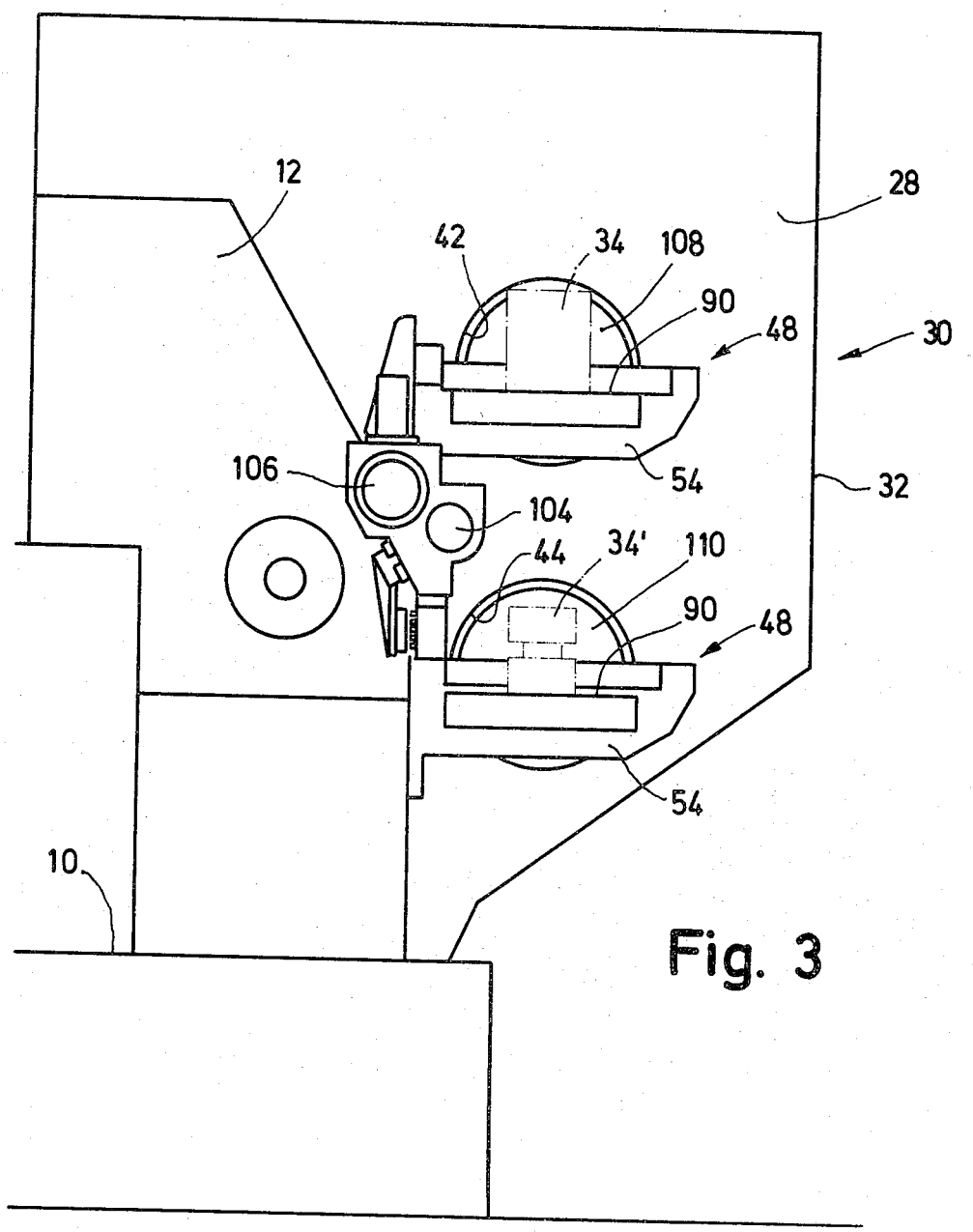
FIG. 3 is a partial side view of the lathe viewed in the direction of the arrow A in FIG. 2.

In the meantime, the workpiece gripper 46 of the upper feeding device 36 will have been controlled to move back again to its take-over position shown in FIG. 2 and will already have picked up a fresh workpice blank which is now held ready at the transfer station so that already during machining of a workpiece the workpiece clamping device 100 can take over a fresh blank.

After machining of the workpiece is finished, after a completed axial movement of the transport device 40 into the position shown in FIG. 1, the transport device is so pivoted that now the workpiece clamping device 102 is orientated coaxially of the machined workpiece whereupon this workpiece clamping device, as a result of displacement of the transport device in the opposite direction, is moved into the workpiece and can pick up the latter. In this respect, care must be taken that during this movement of the transport device 40 the workpiece clamping device 100 is already holding ready a workpiece blank. After the machined workpiece has been picked up by the workpiece clamping device 102, the transport device travels a distance to the right according to FIG. 1 in order to make it possible for the workpiece blank to be pivoted in front of and subsequently clamped in the chuck 14. After the blank has been released by the workpiece clamping device 100, the transport device 40 according to FIG. 1 again travels a distance in the opposite direction after which it is pivoted in an anti-clockwise direction and is controlled to move back into its waiting position according to FIG. 2. As this happens, the workpiece which has been completely machined is fed to the transfer station of the lower feeding device 38 behind the splash wall 28 whereby it can be taken over by the workpiece gripper 46 and by pivoting thereof in an anti-clockwise direction can be fed to and transported away from a transfer station located on the conveyor 48. In the meantime, the upper feeding device 36 has already delivered a workpiece blank to the workpiece clamping device 100 of the transport device 40 and upon completion of the current workpiece machining, the aforedescribed working cycle of the transport device 40 for loading and unloading the chuck 14 recommences.

As FIGS. 7a and 7c show, the drive of the workpiece gripper members 60, 62 may be so selected by the spur gear transmission that workpieces, for example relatively short shaft parts, can during pivoting of the workpiece gripper 46 of the feeding devices 36, 38 along the partial paths in the plane a-a be rotated parallel with themselves or in such a way that, as FIG. 7c shows, for example workpiece blanks may be clamped by the workpiece clamping device 100 at the end face on which they were resting while they were being transported by the upper conveyor 48. In this case, the blanks are rotated through 270° along the partial paths which have to be travelled by the feeding device. This means that the direction of rotation of the workpiece gripper members 60, 62 can be rotated in the same direction for any desired position of readiness of blanks in the space at the transfer station.

As has already been explained in detail at the outset, the device according to the invention may also consist of only two functional units, namely a feeding device 36 or 38 and the transport device 40 whereby in this case a workpiece can either be only fed to or removed from the chuck and transported away out of the working space of the machine.

Similarly, the carrier of the transport device can also be constituted by a turret head having a plurality of workpiece clamping devices. In this case, therefore, it is possible to dispense with the provision of a special transport device in the working space of the machine.

Having thus described our invention, what we claim is:

1. A device for loading and unloading a machine tool such as a lathe having at least one feeding device adapted to feed a workpiece to a transfer station and having a transport device for transporting the workpiece which is to be machined from the transfer station to a machining station defined by the work spindle of the machine tool, or vice versa, wherein the feeding device is provided on a first carrier which is pivotable about a pivoting axis disposed at right angles to the work spindle axis and said transport device has a second carrier carrying at least one workpiece clamping device and in which the second carrier is pivotable about an axis which is parallel with the work spindle axis, characterized in that the feeding device (36 or 38) comprises a workpiece gripper (46), means including drive means for mounting said workpiece gripper on said first carrier for movement around an axis parallel to the pivoting axis of the first carrier, and means mounting said second carrier for movement along its axis.

2. A device as in claim 1 including means for varying the ratio of the angular speeds of the carrier and the workpiece gripper.

3. A device as in claim 1 in which said drive means includes means responsive to pivotal movement of said first carrier for rotating said workpiece gripper.

4. A device according to claim 3, characterised in that the carrier of the workpiece gripper (46) is constituted in known manner by at least one pivoting arm (58) while the driving device is constituted by a gear transmission (70 to 78) having a driving pinion (70) which rolls on a fixed rack during pivoting of the pivoting arm (58) and change wheels (80, 82) serving in particular to vary the angle of rotation of the workpiece gripper (46).

5. A device according to claim 4, characterised in that the pivoting arm (58) of the workpiece gripper (46)

forms the transmission housing of the gear transmission formed by spur gearwheels (70 to 78) disposed serially in a common plane and having two groups of intermeshing spur gears and in that the change wheels (80, 82) are adapted to be fitted onto transmission shafts (84, 86) belonging in each case to one of the two groups of spur gears and extending laterally out of the pivoting arm (58).

6. A device according to claim 4 or 5, characterised in that the workpiece gripper (46) has, disposed at a distance from each other and rotationally rigidly but axially displaceably and lockably mounted on the pivoting axis, two pivoting arms (56, 58), whereby the tooth system meshing with the drive pinion (70) of the gear transmission is provided on a longitudinally toothed fixed serrated shaft (88) which is disposed coaxially of and within the pivoting shaft (50) of the pivoting arms (56, 58).

7. A device according to claim 6, characterised in that the workpiece gripper (46) has on each of its two pivoting arms (56, 58) a workpiece gripping member (60, 62) rotatable about an axis parallel with the pivoting axis of the pivoting arms (56, 58) and of which at least the one which is rotatable by the gear transmission (70 to 78) has, disposed at a distance from each other, two supporting members (64) which can be applied with pressure to the periphery of a workpiece (34) which is to be gripped, whereby this gripping member (62) is formed in particular by a cross-sectionally V-shaped prism and which can be displaced relative to the gripping member (60) of the other pivoting arm (56) for clamping or releasing a workpiece, particularly under control by a pressurised medium.

8. A device according to claim 11 for a machine tool, the work spindle of which is mounted horizontally in the head stock, characterised in that the feeding device (36 or 38) is located laterally of the head stock (12), set back in relation to the front thereof and in that the transport device (40) is located in front of the feeding device (36 or 38) and within the working space (26) of the machine, whereby its carriers which support the workpiece clamping device (100 or 102) have in known manner at least one pivoting arm (96 or 98) which in the axial direction of its pivoting axis may be displaced relative to the transfer station of the feeding device (36 or 38) or to the work spindle (16) in order to take over or transfer a workpiece.

9. A loading and/or unloading device according to claim 8, characterised in that there is associated with the feeding device (36) for the preparation of workpieces (34) and in known manner a conveyor (48), in particular an endless conveyor, by means of which the workpieces (34 or 34') can be fed substantially in a horizontal plane parallel with the axial direction of the work spindle (16) from the rear of the head stock (12) and individually to the feeding device (36 or 38) and in that the pivoting axis of the carrier of the feeding device (36 or 38) is disposed substantially parallel with the conveying plane and at right-angles to the conveying direction.

10. A loading and unloading device according to claim 8 or 9 with, associated with the transport device (40), two feeding devices (36, 38) whereby a machined workpiece (34') can be fed by the additional feeding device (38) to a further transfer station, characterised in that by means of the additional feeding device (38), finished workpieces (34') can be fed to a transfer station located outside the working space (26) of the machine and in that the carrier of the transport device (40) has two pivoting arms (96, 98) which in each case carry a workpiece clamping device (100, 102).

11. A loading and unloading device according to claim 10, characterised in that a horizontal conveyor (48) forming in particular an endless conveyor is associated with the additional feeding device (38) for carrying away the workpieces (34') fed to the transfer station.

12. A loading and unloading device according to claim 11, characterised in that the two functional units constituted by in each case a feeding device (36, 38) and a horizontal conveyor (48) are structurally identical and are located at a distance one above the other and laterally of the head stock (12) and in that the workpiece clamping devices (100, 102) on the pivoting arms (96, 98) of the carrier of the transport device (40) can be controlled to move individually in front of the work spindle (16) and jointly to the transfer station of the feeding device (36, 38) associated with them.

13. A loading and unloading device according to claim 12, for a machine tool, in which at the head stock end, the working space of the machine is bounded by a splash wall of a housing-like machine cladding which engages over the working space of the machine and possibly the head stock, characterised in that the transfer station of the feeding devices (36, 38) is disposed immediately behind the splash wall (28) in which, for each transfer station, an aperture (42, 44) is provided which traverses the splash wall and through which the workpiece clamping devices (100, 102) of the transport device (40) have access to their respectively associated transfer stations, and in that both workpiece clamping devices (100, 102) have in each case a closure member (108, 110) which in the transfer position of the workpiece clamping devices in front of the feeding devices (36, 38) and during machining of the workpieces, maintain the apertures (42, 44) in the splash wall (28) closed.

* * * * *

UNITED STATES PATENT AND TRADEMARK OFFICE
CERTIFICATE OF CORRECTION

PATENT NO. : 4,316,398

DATED : February 23, 1982

INVENTOR(S) : Helmut F. Link and Paul Waiblinger

It is certified that error appears in the above-identified patent and that said Letters Patent are hereby corrected as shown below:

Column 9, line 34, claim 11 should read -- claim 1 --.

Signed and Sealed this

Twenty-seventh Day of April 1982

|SEAL|

*Attest:*

*Attesting Officer*

GERALD J. MOSSINGHOFF

*Commissioner of Patents and Trademarks*